US010660164B2

(12) United States Patent
Carmona Martinez et al.

(10) Patent No.: US 10,660,164 B2
(45) Date of Patent: May 19, 2020

(54) COOKTOP DEVICE

(71) Applicant: BSH Hausgeräte GmbH, Munich (DE)

(72) Inventors: Manuel Carmona Martinez, Seville (ES); Juan Llado Paris, Saragossa (ES); Sergio Llorente Gil, Saragossa (ES); Jesús Ricardo Ruiz Gracia, Movera (ES); Beatriz Sanchez Tabuenca, Saragossa (ES); Julen Urdangarin Garcia, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 429 days.

(21) Appl. No.: 15/521,899

(22) PCT Filed: Oct. 27, 2015

(86) PCT No.: PCT/IB2015/058265
§ 371 (c)(1),
(2) Date: Apr. 26, 2017

(87) PCT Pub. No.: WO2016/071802
PCT Pub. Date: May 12, 2016

(65) Prior Publication Data
US 2017/0318628 A1 Nov. 2, 2017

(30) Foreign Application Priority Data
Nov. 3, 2014 (ES) .................................. 201431611

(51) Int. Cl.
*H05B 6/12* (2006.01)
*F24C 15/10* (2006.01)
*H05B 3/68* (2006.01)

(52) U.S. Cl.
CPC ........... *H05B 6/1245* (2013.01); *F24C 15/10* (2013.01); *F24C 15/103* (2013.01);
(Continued)

(58) Field of Classification Search
CPC ...... H05B 6/062; H05B 6/065; H05B 6/1209; H05B 6/1218; H05B 6/1245;
(Continued)

(56) References Cited

U.S. PATENT DOCUMENTS 3,987,268 A * 10/1976 Maeda .................... H01H 19/62
219/622
3,989,916 A * 11/1976 Amagami ............. H02M 7/523
219/622
(Continued)

FOREIGN PATENT DOCUMENTS

| CN | 86103989 A | 4/1987 |
| CN | 87103643 A | 1/1988 |

(Continued)

OTHER PUBLICATIONS

National Search Report CN 201580059866.2 dated Oct. 8, 2018.
(Continued)

Primary Examiner — Hung D Nguyen
(74) Attorney, Agent, or Firm — Michael E. Tschupp; Andre Pallapies; Brandon G. Braun

(57) ABSTRACT

A cooktop device, in particular an induction cooktop device, includes a base component and an articulated arm having a first arm part and a second arm part, with the articulated arm bearing exactly one heating element. A joint supports the second arm part for movement relative to the first arm part, and a suspension connects the first arm part to the base component.

26 Claims, 3 Drawing Sheets

(52) U.S. Cl.
CPC ............. *F24C 15/105* (2013.01); *H05B 3/68* (2013.01); *H05B 2206/022* (2013.01); *Y02B 40/126* (2013.01)

(58) Field of Classification Search
CPC .. H05B 6/1272; H05B 3/68; H05B 2206/022; F24C 15/10; F24C 15/103; F24C 15/105; Y02B 40/126
USPC ....... 219/620, 622, 624, 625, 657, 658, 671, 219/672, 675, 676
See application file for complete search history.

(56) References Cited

U.S. PATENT DOCUMENTS

| | | | |
|---|---|---|---|
| 4,114,009 A | 9/1978 | Kiuchi et al. | |
| 2014/0231413 A1 | 8/2014 | Zanetti et al. | |

FOREIGN PATENT DOCUMENTS

| | | | |
|---|---|---|---|
| CN | 103377973 A | * | 10/2013 |
| CN | 103377973 A | | 10/2013 |
| EP | 0556251 B1 | | 12/1994 |
| ES | 2423221 A2 | | 9/2013 |
| GB | 103919 | | 2/1917 |
| GB | 2160969 A | | 1/1986 |
| JP | 2009006049 A | | 1/2009 |
| WO | 2008101766 A1 | | 8/2008 |
| WO | WO-2008-101766 A1 | * | 8/2008 ................ F24C 7/06 |

OTHER PUBLICATIONS

National Search Report ES 201431611 dated Nov. 3, 2014.
International Search Report PCT/IB2015/058265 dated Jan. 21, 2016.

* cited by examiner

COOKTOP DEVICE

CROSS-REFERENCES TO RELATED APPLICATIONS

This application is the U.S. National Stage of International Application No. PCT/IB2015/058265, filed Oct. 27, 2015, which designated the United States and has been published as International Publication No. WO 2016/071802 A1 and which claims the priority of Spanish Patent Application, Serial No. P201431611, filed Nov. 3, 2014, pursuant to 35 U.S.C. 119(a)-(d).

BACKGROUND OF THE INVENTION

The invention relates to a cooktop device.

The international patent application WO 2008/101766 A1 discloses a cooktop device which has an articulated arm and a suspension for connecting the articulated arm to a base component. The articulated arm has two or more joints. Consequently, the articulated arm has three or more arm parts. The cooktop device comprises four heating elements. The articulated arm bears all of the heating elements and moves the heating elements by means of a carousel-type moving mechanism in order to heat a "gigantic" heating zone.

BRIEF SUMMARY OF THE INVENTION

The object of the invention is in particular to provide a device of the type in question, having improved properties in respect of low costs and/or high flexibility. The object is inventively achieved by the features in claims.

The invention relates to a cooktop device, in particular an induction cooktop device, comprising an articulated arm which has a first arm part and a second arm part, a joint which is designed to support the second arm part in such a way that the second arm part can be moved relative to the first arm part, and a suspension for connecting the first arm part to a base component.

According to the invention, the articulated arm is designed to bear exactly one heating element, in particular a single heating element. A "cooktop device" is intended to signify in particular at least a part, in particular a subassembly, of a cooktop, in particular an induction cooktop. In particular, the cooktop device can also comprise the whole cooktop, in particular the whole induction cooktop. An "articulated arm" is intended to signify in particular a unit which provides in particular a mechanical connection between the base component and the heating element, and which advantageously has exactly two arm parts but could also have in particular a larger number of arm parts. An "arm part" is intended to signify in particular an element of the articulated arm, said element being in particular at least largely inflexible and/or rigid and being advantageously without joints. An arm part among the arm parts of the articulated arm provides in particular a mechanical connection between the joint and a component, e.g. the heating element, and/or between two adjacent joints and/or between the joint and the suspension. An "at least largely" inflexible and/or rigid element is intended to signify in particular an element which, at a temperature of 20° C., has a rigidity modulus of at least 0.1 GPa, in particular at least 1 GPa, advantageously at least 3 GPa, particularly advantageously at least 5 GPa, preferentially at least 10 GPa, preferably at least 15 GPa and particularly preferably at least 20 GPa, and/or has an elasticity modulus of at least 1 GPa, in particular at least 5 GPa, advantageously at least 10 GPa, particularly advantageously at least 20 GPa, preferentially at least 40 GPa, preferably at least 60 GPa and particularly preferably at least 80 GPa. A "joint" is intended to signify in particular a unit which provides in particular a mechanical connection between a first object and a second object, and which supports in particular the second object in such a way that said second object can be moved, and in a particularly advantageous embodiment can be swiveled about at least one swiveling axis and/or rotational axis, relative to the first object. The joint is advantageously designed to change in particular an orientation and advantageously a main direction of extension of the second arm part relative to the first arm part. For example, the joint can be embodied as a ball-and-socket joint and/or as a rotating joint and/or as a swivel bearing. A "main direction of extension" of an object is intended to signify in particular a direction which is parallel to a longest side of an imaginary cuboid which just encloses the object. If the main directions of extension of the arm parts of the articulated arm are aligned at least largely parallel to each other and in particular point at least largely in the same direction, the articulated arm advantageously has a maximal extent, in particular a maximal longitudinal extent. In particular, an arm part among the arm parts has an extent, in particular a longitudinal extent, which advantageously corresponds to at least 5% and in particular maximally 95% of a value of the maximal extent of the articulated arm. A "suspension" is intended to signify in particular a unit which is designed to fasten the articulated arm in particular to the base component, and advantageously to support the articulated arm in such a way that said articulated arm can be moved, in particular swiveled about at least one axis of revolution, relative to the base component. A "base component" is intended to signify in particular a component which has a mass of at least 200%, in particular at least 300%, advantageously at least 400% and preferentially at least 500% of a combined mass of the articulated arm and the heating element, and/or which is advantageously designed to absorb in particular active forces coming from the articulated arm, and to transfer these forces to a further unit such as e.g. a subsurface and/or a worktop and/or a wall and/or a housing. A "heating element" in this context is intended to signify in particular an element which is designed to convert energy, preferentially electrical energy, into heat and in particular to supply said energy to at least one cooking utensil of the at least two cooking utensils. The heating element is advantageously embodied in particular as an induction heating element and is preferentially designed in this case to generate an electromagnetic alternating field, in particular having a frequency between 20 kHz and 100 kHz, which is provided in particular for conversion into heat by means of eddy-current induction and/or magnetic reversal effects in a cooking utensil base, in particular a metallic and preferentially ferromagnetic cooking utensil base which has been placed. In particular, in at least a first operating state, a value of a distance to a further heating element, this being in particular adjacent to the exactly one single heating element, is at least 5 cm, in particular at least 7 cm, advantageously at least 10 cm, particularly advantageously at least 12 cm and preferentially at least 15 cm, wherein the distance is measured in particular between outer boundaries of the heating elements concerned and said outer boundaries are facing each other in the at least one first operating state. The exactly one heating element is wound onto exactly one coil carrier in particular in at least one assembled state, and is advantageously borne by the exactly one coil carrier which is itself borne by the articulated arm in particular in the at least one assembled state. In particular, the exactly one heating element has an at least largely oval and advantageously at least largely circular shape. The exactly one heating element can for example have in particular at least two partial heating elements, which can advantageously be operated independently of each other and wound from different heat conductors. According to the invention, the at least two partial heating elements are designed in particular to heat a shared heating zone. In particular, the at least two partial heating elements are so arranged as to be fixed relative to each other. For example, a value of a distance between facing outer boundaries of the at least two partial heating elements can be maximally 5 cm, in particular maximally 4 cm, advantageously maximally 3 cm, particularly advantageously maximally 2 cm and preferentially maximally 1 cm. The at least two partial heating elements can be arranged in particular concentrically relative to each other and/or next to each other, in particular for the purpose of heating a roasting tin. Alternatively, the exactly one heating element can advantageously comprise exactly one heat conductor, in particular a single heat conductor. "Designed" is intended to signify in particular specifically programmed, configured and/or equipped. An object being designed for a specific function is intended to signify in particular that said object satisfies and/or executes this specific function in at least one application state and/or operating state.

By means of the inventive embodiment, it is possible to achieve low costs and/or high flexibility in particular. By virtue of a modest load capacity in the form of exactly one single heating element, an articulated arm can advantageously be embodied economically, in particular from inexpensive material. By means of the exactly one single heating element, it is possible in particular to heat heating zones of flexible size, advantageously also heating zones for heating small cooking utensils, it being advantageously possible in particular to select a high frequency of movement of the heating element in order to heat larger heating zones. In comparison with a typical matrix cooktop, it is advantageously possible to achieve a small number of components such as heating elements in particular. In comparison with a matrix cooktop, it is possible in particular to heat a larger number of cooking utensils by means of a smaller number of heating elements, thereby advantageously allowing a high degree of effectiveness and/or a high degree of efficiency. In comparison with a matrix cooktop, it is possible in particular to heat a cooking utensil of any type, e.g. in particular of any shape and/or any size.

According to the invention, the cooktop device comprises the base component on which the first arm part is so supported as to be rotatable, in particular about a rotational axis, through an angular range of at least 90°, in particular at least 120°, advantageously at least 150° and preferentially at least 170°. For example, the first arm part can be so supported on the base component as to be rotatable, in particular to swivel, about the rotational axis through an angular range of at least 225°, in particular at least 270°, advantageously at least 310°, particularly advantageously at least 350° and preferentially at least 360°, wherein the first arm part can be so supported on the base component as to be rotatable, in particular any number of times through an angular range of at least 360°, and advantageously so arranged as to be continuously revolvable. However, the first arm part is advantageously so supported on the base component as to be rotatable, in particular to swivel, about the rotational axis by maximally 360°, in particular maximally 315°, advantageously maximally 270°, particularly advantageously maximally 230° and preferentially maximally 190°. The first arm part can therefore be supported in particular in a flexible manner relative to the base component.

According to the invention, the cooktop device has a first motor, in particular an electric first motor, which is designed to move the first arm part relative to the base component, in particular about the rotational axis. A "motor" is intended to signify in particular a structural unit which is designed to convert a form of energy, e.g. thermal energy and/or electrical energy and/or chemical energy, into kinetic energy. It is thereby possible to provide in particular a high degree of operational capability and/or a high degree of mobility.

According to the invention, the second arm part is so supported on the first arm part as to be rotatable, in particular about a swiveling axis, through an angular range of at least 270°, in particular at least 300°, advantageously at least 330° and particularly advantageously at least 350°. The second arm part is preferentially so supported on the first arm part as to be rotatable about the swiveling axis through an angular range of at least 360°, wherein the first arm part can be so supported as to be rotatable about the swiveling axis, in particular any number of times in succession and advantageously in the same direction through an angular range of at least 360°. According to the invention, the second arm part can be so supported on the first arm part as to be in particular continuously revolvable, e.g. in the manner of a carousel, about the swiveling axis. It is thereby possible to allow in particular flexible heating of a cooking utensil. In particular, the single heating element can be arranged at a multiplicity of different positions.

According to the invention, the cooktop device comprises a second motor, in particular an electric second motor, which is designed to move the second arm part relative to the first arm part in particular about the swiveling axis, whereby in particular a high degree of mobility can be achieved.

According to the invention, the first motor is designed to act directly on the first arm part. The expression that an object is designed to act "directly" on a further object is intended to signify in particular that the object acts immediately upon the further object, wherein the object and the further object touch in particular at least partly, and/or wherein in particular at most one contact element is arranged between the object and the further object, said contact element at least partly touching the object and the further object and advantageously having in at least one cross-sectional plane a spread, in particular a material size and/or thickness, which corresponds in particular maximally to a spread of a smaller of the two objects. The expression that an object is designed to "act on" a further object is intended to signify in particular that the object, advantageously at least an element of the object, exerts a force on the further object, wherein the object has in particular two elements which can move relative to each other, such as in particular a stator and/or a rotor, of which at least one element exerts the force on the further object. It is thereby possible to achieve in particular a short distance of force.

In a further embodiment of the invention, the first motor is designed to act indirectly on the first arm part. The expression that an object is designed to act "indirectly" on a further object is intended to signify in particular that the object acts on the further object via a further structural unit, wherein said structural unit is arranged in particular between the object and the further object, and advantageously transfers at least one force between the object and the further object. It is thereby possible to achieve in particular a flexible arrangement of the first motor relative to the first arm part.

According to the invention, the cooktop device comprises a first transmission, by means of which the first motor acts on the first arm part. A "transmission" is intended to signify in particular a unit which is advantageously designed to transfer at least one motional characteristic, e.g. a direction and/or an acceleration and/or a speed, and/or at least one moment of force, e.g. a force and/or a torque, from an object to a further object and/or which is designed in particular to change the at least one motional characteristic and/or the at least one moment of force in particular during the transfer. In particular, the transmission can transfer the at least one moment of force unchanged while changing the moment of motion, e.g. a speed of rotation about an axis of revolution, wherein the transmission can advantageously change a transmission ratio between the object and the further object in this type of configuration. It is thereby possible to effect in particular a force ratio and/or a speed ratio, whereby in particular a low speed of rotation can be achieved.

According to the invention, the second motor is designed to act directly on the second arm part, thereby making it possible to ensure a limited number of possible error sources and/or to provide a compact embodiment.

In a further embodiment of the invention, the second motor is designed to act indirectly on the second arm part, thereby making it possible to achieve in particular a high degree of structural freedom with regard to an arrangement of components.

According to the invention, the cooktop device comprises a second transmission, by means of which the second motor acts on the second arm part, whereby in particular a high degree of flexibility can be achieved due to the possibility of a force ratio and/or speed ratio.

According to the invention, the first arm part has a locating region for supporting the second arm part. A "locating region" of the first arm part is intended to signify in particular a region which is delimited in particular on at least two sides by the first arm part, and in which the second arm part, in at least one position of the second arm part, is advantageously arranged, at least to a large extent, relative to the first arm part. In the at least one position, in particular a weight proportion and/or volume proportion of at least 50%, in particular at least 70%, advantageously at least 80% and preferentially at least 90% of the second arm part is arranged in the locating region of the first arm part. The locating region is advantageously arranged at that end of the first arm part which faces away from the suspension, and is designed in particular to allow a free rotation of the second arm part relative to the first arm part through the angular range of at least 270°, in particular about the swiveling axis. It is thereby possible to achieve in particular free swiveling of the second arm part relative to the first arm part.

According to the invention, the cooktop device is not limited to the application and embodiment variant described above. In particular, in order to satisfy a functionality described herein, the cooktop device may have a number of individual elements, components and units which varies from a number cited herein.

BRIEF DESCRIPTION OF THE DRAWINGS

Further advantages are derived from the following description of the drawing. Exemplary embodiments of the invention are illustrated in the drawing. The drawing, the description and the claims contain numerous features in combination. A person skilled in the art will also consider the features individually as appropriate, and combine them in further suitable combinations.

DETAILED DESCRIPTION OF EXEMPLARY EMBODIMENTS OF THE PRESENT INVENTION

Figure 1:
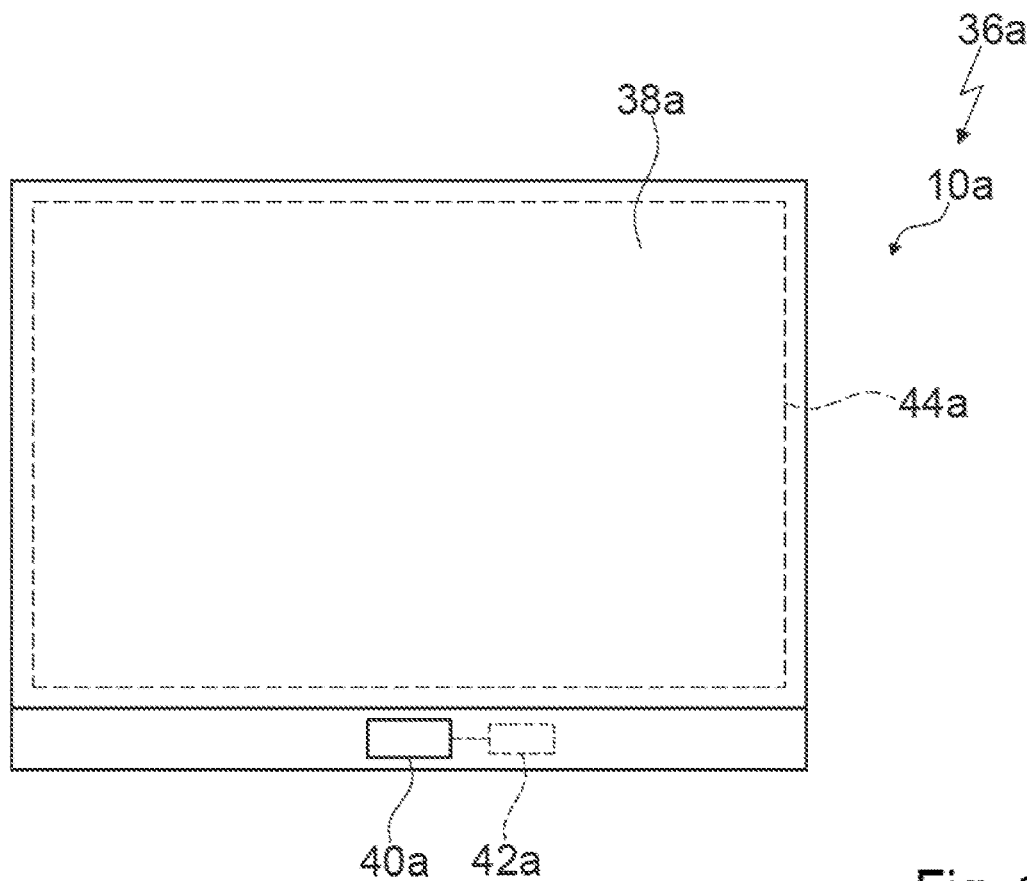
FIG. 1 shows a cooktop with a cooktop device in a schematic plan view.

FIG. 1 shows a cooktop 36 which is embodied as an induction cooktop, having a cooktop device 10 that is embodied as an induction cooktop device. The cooktop device 10 comprises a cooktop plate 38. The cooktop plate 38 is designed for the placement of cooking utensils. In an assembled state, the cooktop plate 38 forms part of an outer housing, and in particular an outer housing of the cooktop 36.

Figure 2:
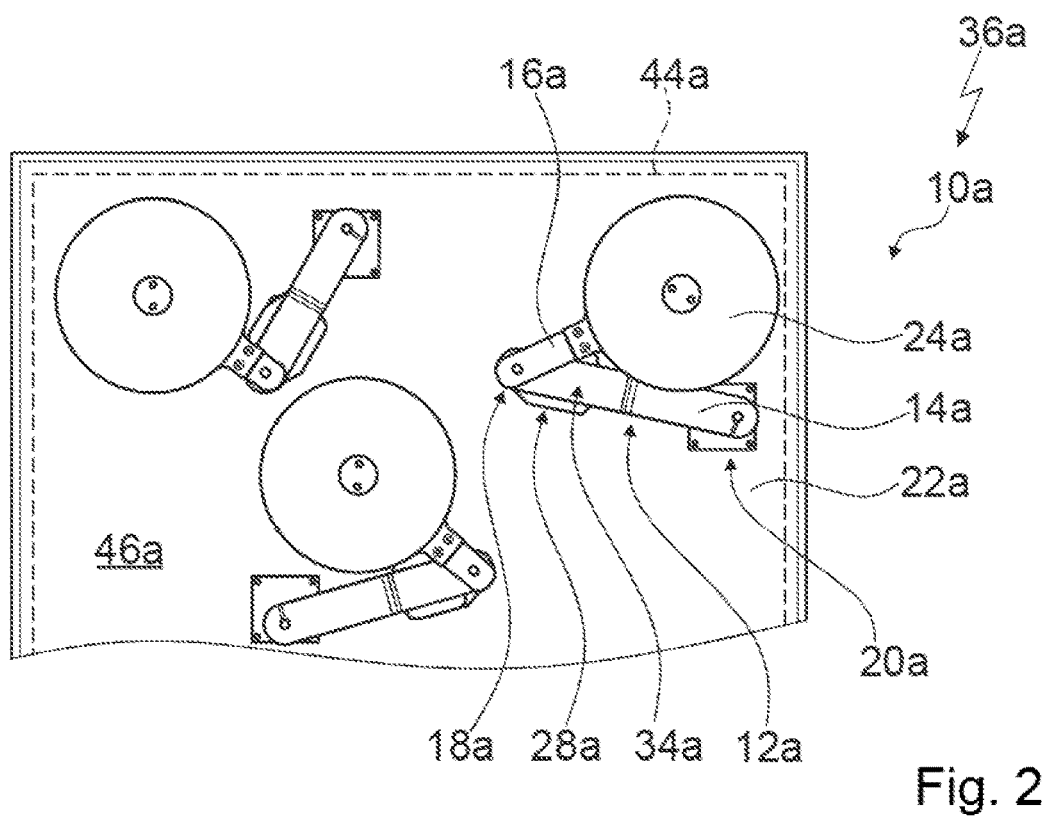
FIG. 2 shows a section of the cooktop with the cooktop device in a schematic plan view, wherein a cooktop plate is not illustrated.

The cooktop device 10 comprises a plurality of heating elements 24 (cf. FIG. 2). In the present exemplary embodiment, the cooktop device 10 comprises three heating elements 24. Alternatively, the cooktop device could have fewer heating elements, e.g. exactly one heating element or two heating elements. In an alternative embodiment, the cooktop device could comprise at least four and in particular at least five heating elements. The heating elements 24 are so arranged as to be mobile. The heating elements 24 define a variable cooking surface area 44. The variable cooking surface area 44 extends over a large part of a surface extent of the cooktop plate 38. According to the invention, the variable cooking surface area 44 extends over at least 60%, in particular at least 70%, advantageously at least 75% and preferentially at least 80% of a surface extent of the cooktop plate 38. In the following, only one of the heating elements 24 is described. The heating element 24 is designed to heat a cooking utensil which has been placed on the cooktop plate 38.

The cooktop device 10 comprises an operating unit 40 for entering and/or selecting operating parameters (cf. FIG. 1), e.g. a heat output and/or a heat output density and/or a heating zone. The operating unit 40 is designed to output a value of an operating parameter to a user.

The cooktop device 10 comprises a control unit 42. The control unit 42 is designed to execute actions and/or change settings as a function of operating parameters that have been entered by means of the operating unit 40. In a heating mode, the control unit 42 controls an energy supply to the heating element 24. The cooktop device 10 has a supply unit (not shown) for the purpose of supplying electrical components such as the heating element 24 and/or the control unit 42, for example. The control unit 42 controls the power supply in the heating mode, in order to supply the activated heating element 24 with electrical current.

The heating element 24 is so arranged as to be mobile. In an operating state, as a function of a position of a cooking utensil that has been placed, the control unit 42 moves the heating element 24 to the position of the cooking utensil. In the operating state, the control unit 42*a* moves the heating element 24*a* in a plane which is aligned largely parallel to a main plane of extension of the cooktop plate 38*a*. In the operating state, the heating element 24a can be moved in two degrees of freedom by the control unit 42.

The heating element 24 is designed to heat a plurality of cooking utensils simultaneously. For example, it is assumed that two cooking utensils are placed. In the event that two cooking utensils have been placed, the control unit 42 determines a frequency of movement of the heating element 24 between a position of a first cooking utensil and a position of a second cooking utensil. Heating two or more cooking utensils using one heating element 24 is known from the prior art and is not a fundamental aspect of this invention. It is therefore not described in further detail in the following.

The cooktop device 10 comprises a base component 22 (cf. FIG. 2). The base component 22 is embodied as a housing component. The base component 22 and the cooktop plate 38 together form the outer housing. The base component can comprise a plurality of elements, for example, which can be in particular interconnected and advantageously together embody the housing component. The base component 22 is a unitary part in the present exemplary embodiment. The base component 22 has a floor. The base component 22a has side walls. In the assembled state, the base component 22 forms a part of the outer housing, said part facing away from the user. The base component 22 is designed for the purpose of supporting components, in particular components of the cooktop 36 and/or cooktop device 10. In combination with the cooktop plate 38, the base component 22 in the assembled state defines an internal space 46 for supporting the components. In the assembled state, the control unit 42, the operating unit 40 and the heating element 24 are arranged in the internal space 46.

In the assembled state, the heating element 24 is connected to the base component 22. The cooktop device 10 comprises an articulated arm 12. In the assembled state, the articulated arm 12 connects the base component 22 and the heating element 24 to each other. In the assembled state, the articulated arm 12 bears the heating element 24. In the assembled state, the articulated arm 12a here bears exactly one single heating element 24a. In the operating state, the articulated arm 12 supports the heating element 24 in such a way that said heating element 24 can be moved relative to the base component 22. The articulated arm 12 has a first arm part 14 and a second arm part 16. The first arm part 14 and the second arm part 16 are so arranged as to be mobile relative to each other. The cooktop device 10 comprises a joint 18. The joint 18 supports the second arm part 16 in such a way that said second arm part 16 can be moved relative to the first arm part 14. The joint 18a couples the first arm part 14a to the second arm part 16a.

For the purpose of connecting the first arm part 14 to the base component 22, the cooktop device 10 comprises a suspension 20. In the assembled state, the suspension 20 fastens the articulated arm 12 to the base component 22. In the assembled state, the suspension 20 fastens the first arm part 14 to the base component 22. The articulated arm 12 and the suspension 20 are embodied as discrete units. In the assembled state, the suspension 20 connects the articulated arm 12 to the floor of the base component 22. In the assembled state, the suspension 20 supports a large part of the articulated arm 12 at a distance from the base component 22.

The first arm part 14 is arranged in such a way that it can be moved relative to the base component 22. According to the invention, the first arm part 14 is so supported on the base component 22 as to be rotatable through an angular range of approximately 180°. The cooktop device 10 comprises a first motor 26, which supports the first arm part 14 in such a way that said first arm 14 can be moved relative to the base component 22 (cf. FIG. 3). The first motor 26 is embodied as an electric motor. In the assembled state, the first motor 26 supports the first arm part 14 in such a way that said first arm part 14 can be rotated relative to the base component 22 about a rotational axis 48.

In the present exemplary embodiment, in the assembled state, the first motor 26 acts directly on the first arm part 14. In the assembled state, the first motor 26 and the first arm part 14 touch each other at least partly. In the operating state, a transfer of moments, e.g. moments of force and/or moments of motion, takes place directly between the first motor 26 and the first arm part 14. In the assembled state, the first motor 26 is arranged between the first arm part 14 and the base component 22. The first motor 26 is arranged at that end of the first arm part 14 which faces away from the second arm part 16.

The first arm part 14 has a first section 50 and a second section 52. In the assembled state, the first section 50 forms that part of the first arm part 14 which faces away from the second arm part 16. In the assembled state, the second section 52 forms that part of the first arm part 14 which faces toward the second arm part 16. The first arm part 14 has a third section 54. The third section 54 interconnects the first section 50 and the second section 52. The sections 50, 52, 54 so arranged as to be fixed relative to each other. The sections 50, 52, 54 are rigidly connected together. In the present exemplary embodiment, the sections 50, 52, 54 are embodied as a unitary part. The third section 54 is oriented largely perpendicular relative to the first section 50 and the second section 52. In the assembled state, the first section 50 has a greater distance from the floor of the base component 22 than the second section 52. The distance here is oriented largely parallel to a vertical direction 56. In the assembled state, the vertical direction 56 is oriented largely perpendicular to a main plane of extension of the base component 22. In the assembled state, the vertical direction 56 is oriented largely perpendicular to a main plane of extension of the cooktop plate 38. In an installed position, the vertical direction 56 is oriented largely parallel to a direction of gravitational force. In the assembled state, the vertical direction 56 points from the cooktop plate 38 toward the base component 22. Viewed from the side, the first arm part 14 has a stepped shape.

In the assembled state, a main direction of extension of the first section 50 and a main direction of extension of the second section 52 are oriented largely parallel to each other. The main direction of extension of the first section 50 and the main direction of extension of the second section 52 define a main direction of extension of the first arm part 14. In the assembled state, the main direction of extension of the first arm part 14 is oriented largely parallel to the main plane of extension of the base component 22. In the assembled state, a main direction of extension of the second arm part 16 and the main plane of extension of the base component 22 are oriented largely parallel to each other. A main plane of extension of a structural unit is in particular a plane which is parallel to a largest lateral surface of the smallest geometric cuboid that just encloses the structural unit fully. In this type of configuration, the main plane of extension passes in particular through the center of the cuboid.

In the assembled state, the second arm part 16 is arranged on the first arm part 14 in a region of the second section 54 of the first arm part 14. In the assembled state, the second arm part 16 here is supported in such a way that it can be rotated through an angular range of at least 360° on the first arm part 14. In the assembled state, the second arm part 16 is so arranged that it can be rotated any number of times through 360° relative to the first arm part 14. In the assembled state, the second arm part 16 is arranged on that side of the first arm part 14 which faces away from the base component 22, in particular the floor of the base component 22. The first arm part 14 has a locating region 34 for supporting the second arm part 16.

In the assembled state, the locating region 34 is delimited in the vertical direction 56 by the second section 52 of the first arm part 14. In the assembled state, in a direction pointing from the second arm part 16 toward the first section 50, the locating region 34 is delimited by the first section 50. In the assembled state, in the direction pointing from the second arm part 16 toward the first section 50, the locating region 34 is also delimited by the third section 54. In the assembled state, the locating region 34 allows the second arm part 16 to revolve freely relative to the first arm part 14.

The cooktop device 10a comprises a second motor 28a. The first motor 26a and the second motor 28a are independent of each other. In the operating state, the second motor 28a moves the second arm part 16a relative to the first arm part 14a. For example, the second motor can be embodied as a linear motor and designed to support the second arm part in particular in a translatory manner relative to the first arm part. In the present exemplary embodiment, the second motor 28a is designed to support the second arm part 16a in such a way that said second arm part 16a can be rotated, in particular swiveled, about a swiveling axis 58a relative to the first arm part 14a. In the operating state, the second motor 28a rotates the second arm part 16a about a swiveling axis 58a.

In the operating state, the second motor 28a acts indirectly on the second arm part 16a. For example, a coupling element can be arranged between the second motor and the second arm part. According to the invention, the cooktop device can comprise in particular the coupling element. The coupling element can connect in particular the second motor and the second arm part to each other. The second motor can exert in particular a moment of force and/or a moment of motion on the coupling element. The coupling element can advantageously transfer the moment of force and/or the moment of motion to the second arm part. For example, the coupling element can be embodied as a band and/or a chain and/or a strap and/or a belt. In the present exemplary embodiment, the cooktop device 10 comprises a second transmission 32a. In the operating state, the second motor 28 acts on the second arm part 16a by means of the second transmission 32a.

The second motor 28a has a second motor element 64a. In the operating state, the second motor element 64a rotates about a further swiveling axis 60a. In the assembled state, the second motor element 64a is coupled to the second transmission 32a. In the operating state, the second motor 28a transfers moments such as in particular a moment of force and/or a moment of motion to the second transmission 32a, in particular by means of the second motor element 64a. In the operating state, the second motor 28a acts directly on the second transmission 32a. In the operating state, the second transmission 32a acts directly on the second arm part 16a.

In the assembled state, the second motor 28a is arranged on the first arm part 14a. In the assembled state, the second motor 28a is arranged on that side of the first arm part 14a which faces toward the floor of the base component 22a. In the operating state, the second motor 28a acts via the first arm part 14a on the second arm part 16. The second transmission 32a is arranged within the first arm part 14a. The first arm part 14a forms an internal space in which the second transmission 32a is arranged. The second motor 28a engages partly into the internal space of the first arm part 14a, in particular by means of the second motor element 62a.

Figure 3:
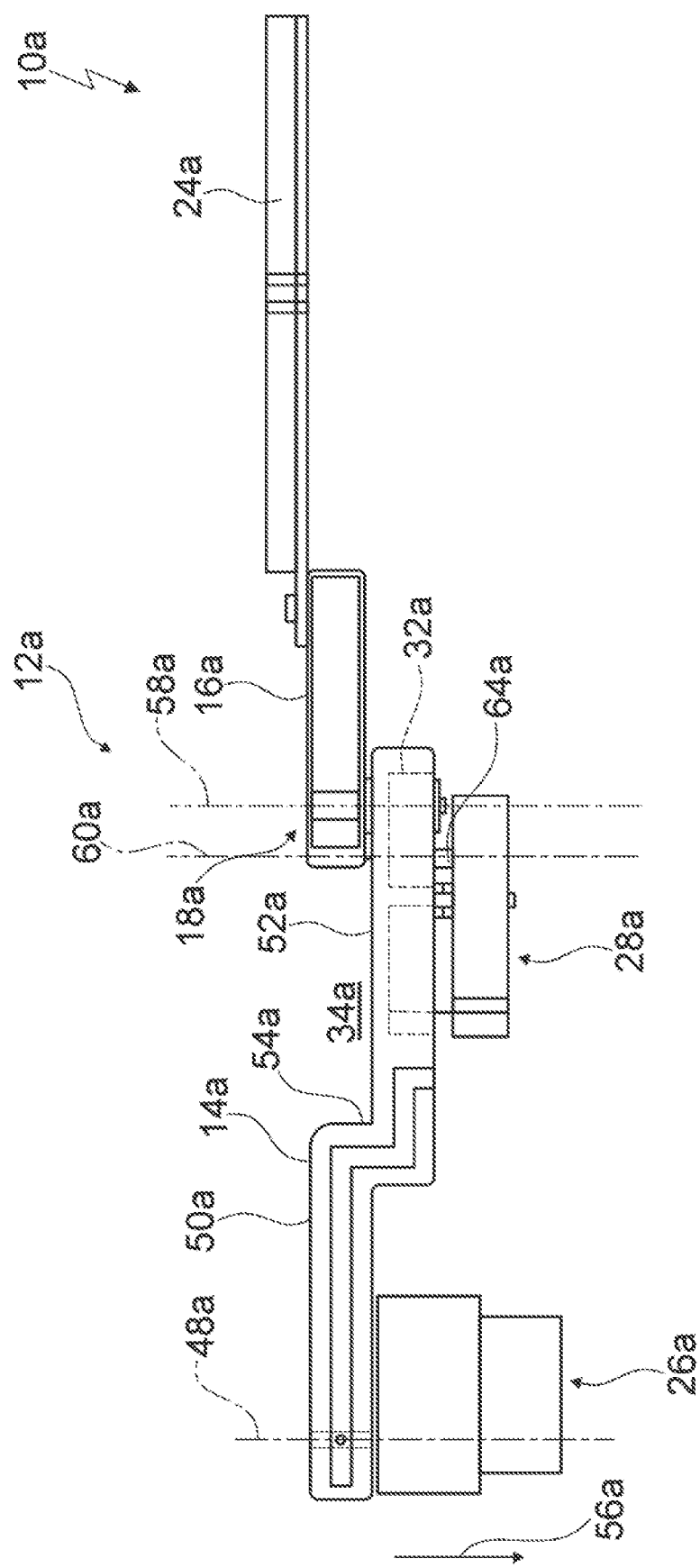
FIG. 3 shows a section of the cooktop device in a schematic side view.
Figure 4:
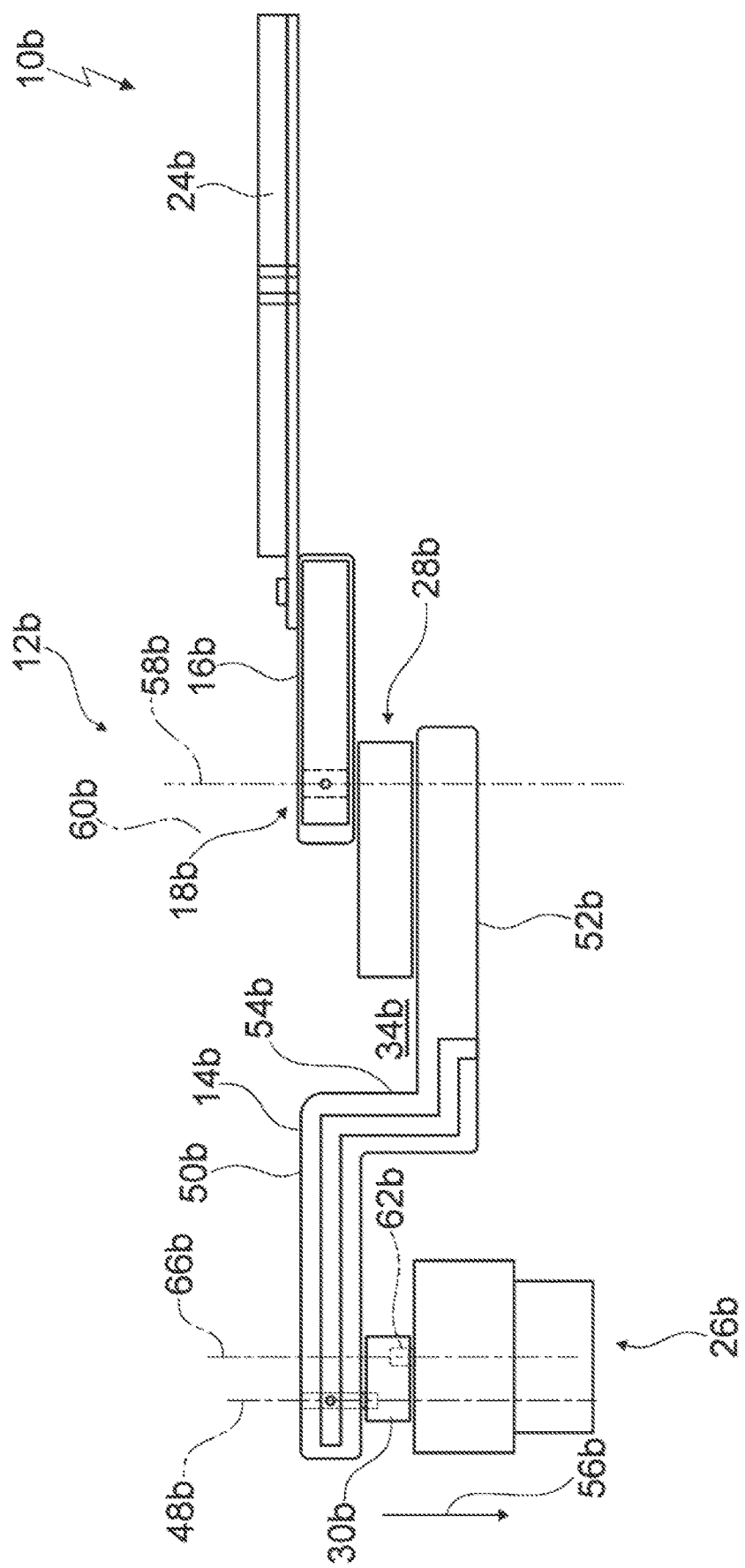
FIG. 4 shows a section of an alternative cooktop device of an alternative cooktop in a schematic side view.

FIG. 4 shows a further exemplary embodiment of the invention. The following descriptions are largely restricted to the differences between the exemplary embodiments, wherein reference may be made to the description of the exemplary embodiment in FIGS. 1 to 3 in respect of components, features and functions which remain the same. In order to distinguish between the exemplary embodiments, the letter a in the reference numbers of the exemplary embodiment in FIGS. 1 to 3 is replaced by the letter b in the reference numbers of the exemplary embodiment in FIG. 4. With regard to components having identical designations, in particular components having identical reference numbers, reference may be made in principle to the drawings and/or the description of the exemplary embodiment in FIGS. 1 to 3.

FIG. 4 shows a section of a cooktop device 10b of a cooktop 36b. The cooktop device 10b comprises an articulated arm 12b which has a first arm part 14b and a second arm part 16b, and a joint 18b which in an assembled state supports the second arm part 16b in such a way that said second arm part 16b can be moved relative to the first arm part 14b. In the assembled state, the articulated arm 18b bears exactly one heating element 24b. In the assembled state, the first arm part 16b is connected to a base component 22b by a suspension 20b.

In an operating state, a first motor 26b acts indirectly on the first arm part 14b. In particular, a coupling element can be arranged between the first motor and the first arm part. In this type of configuration, the cooktop device can comprise in particular the coupling element. The coupling element can connect in particular the first motor and the first arm part to each other. The first motor can exert in particular a moment of force and/or a moment of motion on the coupling element. The coupling element can advantageously transfer the moment of force and/or the moment of motion to the first arm part. For example, the coupling element can be embodied as a band and/or a chain and/or a strap and/or a belt.

In the present exemplary embodiment, the cooktop device 10 comprises a first transmission 32b, by means of which in the operating state the first motor 26b acts on the first arm part 14b. The first motor 26b has a first motor element 62b. In the operating state, the first motor element 62b rotates about a further rotational axis 66b. In the assembled state, the first motor element 62b is coupled to the first transmission 30b. In the operating state, the first motor 28b transfers moments such as e.g. a moment of force and/or a moment of motion to the first transmission 30b, in particular by means of the first motor element 64b. In the operating state, the first motor 26b acts directly on the first transmission 30b. In the operating state, the first transmission 30b acts directly on the first arm part 16b.

The cooktop device 10b comprises a second motor 28b. In the operating state, the second motor 28b acts directly on the second arm part 16b. In the assembled state, the second motor 28b and the second arm part 16b touch each other partly. In the operating state, a transfer of moments, e.g. moments of force and/or moments of motion, takes place directly between the second motor 28b and the second arm part 16b. In the assembled state, the second motor 28b is arranged in a locating region 34b of the first arm part 14b.

In the assembled state, the second motor 28b is arranged on that side of the first arm part 14b which faces away from a floor of the base component 22b. In the assembled state, the first arm part 14b bears the second motor 28b. The second motor 28b is arranged at that end of the first arm part 14b which faces away from the suspension 20b.

The invention claimed is:

1. A cooktop device, comprising:
   a base component,
   an articulated arm having: a first arm part, the first arm part having a first section defining a first horizontal plane, a second section disposed below the first horizontal plane, and a third section interconnecting the first and second sections, and
   a second arm part,
   said articulated arm being configured to bear exactly one heating element, the heating element attached to the second arm part and disposed at or above the first horizontal plane,
   a joint configured to support the second arm part for movement relative to the first arm part, and
   a suspension configured to connect the first arm part to the base component.

2. The cooktop device of claim 1, constructed in the form of an induction cooktop device.

3. The cooktop device of claim 1, wherein the first arm part is supported on the base component for rotation about an angular range of at least 90°.

4. The cooktop device of claim 3, further comprising a first motor configured to move the first arm part relative to the base component.

5. The cooktop device of claim 4, wherein the first motor is configured to act directly on the first arm part.

6. The cooktop device of claim 4, wherein the first motor is configured to act indirectly on the first arm part.

7. The cooktop device of claim 6, further comprising a transmission configured to enable the first motor to act on the first arm part.

8. The cooktop device of claim 1, wherein the second arm part is supported on the first arm part for rotatable about an angular range of at least 270°.

9. The cooktop device of claim 8, further comprising a second motor configured to move the second arm part relative to the first arm part.

10. The cooktop device of claim 9, wherein the second motor is configured to act directly on the second arm part.

11. The cooktop device of claim 9, wherein the second motor is configured to act indirectly on the second arm part.

12. The cooktop device of claim 11, further comprising a transmission configured to enable the second motor to act on the second arm part.

13. The cooktop device of claim 1, wherein the first arm part has a locating region disposed on the second section for supporting the second arm part.

14. A cooktop, comprising a cooktop device which includes a base component, an articulated arm having a first arm part, the first arm part having a first section defining a first horizontal plane, a second section disposed below the first horizontal plane, and a third section interconnecting the first and second sections, and a second arm part, said articulated arm being configured to bear exactly one heating element, the heating element attached to the second arm part and disposed at or above the first horizontal plane, a joint configured to support the second arm part for movement relative to the first arm part, and a suspension configured to connect the first arm part to the base component.

15. The cooktop of claim 14, constructed in the form of an induction cooktop.

16. The cooktop of claim 14, wherein the first arm part is supported on the base component for rotation about an angular range of at least 90°.

17. The cooktop of claim 16, wherein the cooktop device includes a first motor configured to move the first arm part relative to the base component.

18. The cooktop of claim 17, wherein the first motor is configured to act directly on the first arm part.

19. The cooktop of claim 17, wherein the first motor is configured to act indirectly on the first arm part.

20. The cooktop of claim 19, wherein the cooktop device includes a transmission configured to enable the first motor to act on the first arm part.

21. The cooktop of claim 14, wherein the second arm part is supported on the first arm part for rotatable about an angular range of at least 270°.

22. The cooktop of claim 21, wherein the cooktop device includes a second motor configured to move the second arm part relative to the first arm part.

23. The cooktop of claim 22, wherein the second motor is configured to act directly on the second arm part.

24. The cooktop of claim 22, wherein the second motor is configured to act indirectly on the second arm part.

25. The cooktop of claim 24, wherein the cooktop device includes a transmission configured to enable the second motor to act on the second arm part.

26. The cooktop of claim 14, wherein the first arm part has a locating region disposed on the second section for supporting the second arm part.

* * * * *